Dec. 1, 1964 K. W. COOPER, JR 3,159,799
STARTER PROTECTOR FOR D.C.-A.C. INVERTER
Filed July 17, 1961
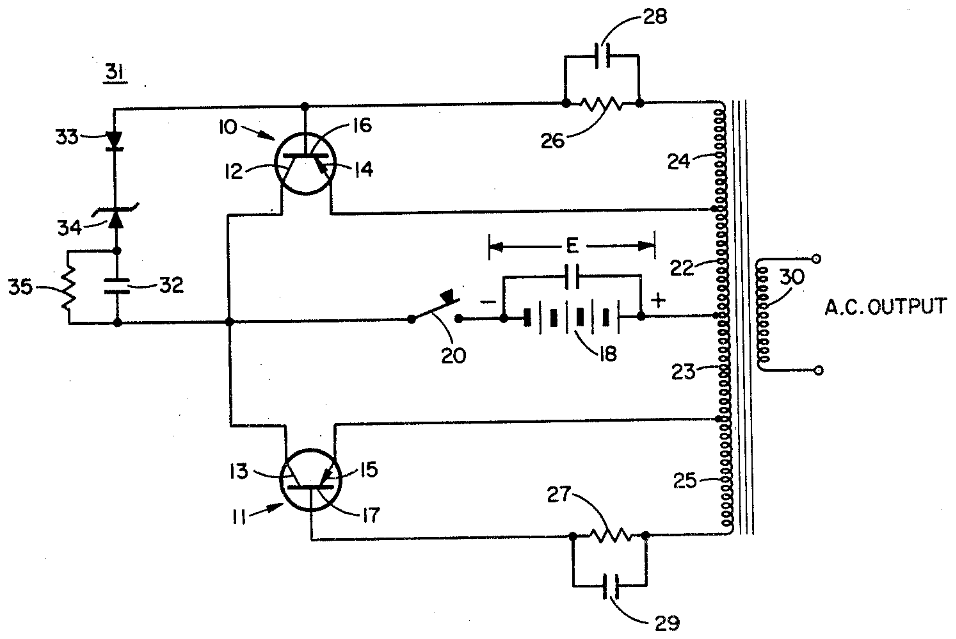
INVENTOR.
KENNETH W. COOPER, JR.
BY
T. L. Styner
ATTORNEY

United States Patent Office 3,159,799
Patented Dec. 1, 1964

3,159,799
STARTER PROTECTOR FOR D.C.–A.C. INVERTER
Kenneth W. Cooper, Jr., Williamson, N.Y., assignor to General Dynamics Corporation, Rochester, N.Y., a corporation of Delaware
Filed July 17, 1961, Ser. No. 124,701
3 Claims. (Cl. 331—112)

This invention relates to D.C.-A.C. inverters of the type using a transistor oscillator and is particularly directed to means for starting oscillations during all temperature and load conditions.

D.C.-A.C. inverters are presently in use of the type comprising usually two transistors in push-pull with the output circuit coupled to the input circuit in the proper phase relation to induce self-sustained oscillations. The start of oscillations normally relies on the leakage current unbalance between the two transistors. Under conditions of high load and/or low temperatures, this leakage current is often insufficient to permit the inverter to start. This condition is generally overcome by the addition of a biasing resistor across the input of one of the transistors. If the biasing resistor is made sufficiently low in value to permit starting under conditions of low temperature and full load, then there exists the possibility of thermal run-away, if the inverter fails to oscillate when the D.C. supply voltage is applied or if oscillations cease because of an overload.

An object of this invention is to provide a starter circuit for an D.C.-A.C. inverter which will insure oscillations under all temperature and load conditions.

A more specific object of this invention is to provide an improved starter protector circuit for a transistor D.C.-A.C. inverter which will not only insure oscillations under all temperature and load conditions but will prevent thermal run-away in the transistor, and yet will not reduce the overall efficiency of the inverter.

The objects of this invention are attained by connecting in series across the input circuit of the oscillating transistor a storage condenser and two diodes, the diodes being oppositely polarized. One of the diodes is of the Zener type having a distinct reverse-resistance breakdown voltage, the distinct reverse-resistance breakdown voltage rating being less than the voltage of the D.C. power source voltage but greater than the control electrode voltage necessary to sustain oscillations. If the oscillator does not start when the D.C. is first applied, the Zener diode will conduct causing the transistor to be forward biased by the discharge of the storage condenser. This in turn causes the transistor to conduct resulting in a drop in the control voltage of the transistor and decoupling of the starter circuit.

Other objects and features of this invention will become more apparent to those skilled in the art by referring to the specific embodiment disclosed in the following specification and shown in the accompanying drawing, in which the single figure is a circuit diagram of the preferred embodiment.

Referring to the drawing, transistor 10 is of the P-N-P type although an N-P-N type may be employed. As usual, transistor 10 is connected in push-pull relation with the second transistor 11, for full-wave self-sustained oscillations. In the embodiment shown, the transistors are connected in the common collector configuration. The collector of transistor 10 is shown at 12, the output electrode being the emitter 14, while the control electrode is the base 16. The output circuit of the transistor 10 includes the primary direct current voltage source 18, switch 20 and primary winding 22. The input or control circuit of the transistor 10 includes the winding 24 coupled inductively to winding 22 and connected between the control electrode 16 and output electrode 14. Biasing resistor 26 is connected in series with the control electrode to bias the base and to limit the base current. The biasing resistor is bypassed for the operating frequency by condenser 28. The circuits of transistor 11 are complementary, the base electrode 17 comprising the control electrode, the emitter 15 comprising the output electrode, and the collector 13 comprising the common electrode. Winding 23 in the output circuit of transistor 11 is inductively coupled to the control circuit winding 25 to keep full-wave self-sustained oscillations. Biasing resistor 27 and its bypass condenser 29 are connected in the base control circuit. The alternating current output is removed through secondary winding 30.

Shown generally at 31 is the starter-protector circuit of this invention connected across the input of transistor 10. This circuit comprises in series the storage condenser 32, the conventional diode 33, and the Zener type diode 34. A Zener diode is a diode which has a very high reverse resistance for all voltages up to a predetermined value known as the reverse break-down voltage, and above which the resistance suddenly drops to zero. The voltage breakdown rating of diode 34 is chosen less than the supply voltage E of battery 18 but greater than the supply voltage necessary to sustain oscillations in transistor 10.

The resistor 35 of high ohmic value is connected across storage condenser 32 to remove the charge therefrom when the oscillator is shut down.

In operation, when the supply voltage E is applied by closing switch 20, the voltage on the bases of the transistors 10 and 11 will rise through resistors 26 and 27, respectively, to a value equal to voltage E, and condenser 32 is charged relatively slowly by the leakage current through the diodes. As the two base voltages rise, one of two events will occur. Either the inverter will start oscillating by itself before the base voltage at 16 reaches the breakdown voltage of the Zener diode 34, or the voltage on the base 16 will reach the breakdown voltage of the Zener diode before oscillations are initiated. In the latter case, the Zener diode breaks down and will substantially conduct causing transistor 10 to be forward biased by the discharge capacitor 32. This causes transistor 10 to conduct, resulting in a drop in the voltage of the base 16 and the decoupling of the starter circuit by the diode 33. This results in the initiation of oscillation. On subsequent cycles, the capacitor 32 becomes charged to the maximum positive voltage generated by the oscillator less the Zener voltage.

Resistor 35 has a high resistance and serves to discharge capacitor 32 when the D.C. supply voltage is removed or when oscillations are stopped.

When oscillations are inadvertently stopped, as by a short-circuited load, neither transistor 10 nor 11 will conduct since conduction through diode 33 is limited by the small bias that will eventually appear at the base 16 through resistance 35. But since resistance 35 is of high value and since the bias under conditions of non-oscillation is sustained only by resistance 35, this bias is insignificantly small.

Accordingly, the D.C.-A.C. inverter of this invention will not only start under all temperature conditions and full load but will positively prevent thermal run-away should the inverter fail, for any reason.

What is claimed is:

1. An oscillator for converting direct current power to alternating current power comprising a transistor with a control electrode, an output electrode and a common electrode, an alternating current output circuit coupled between said output electrode and said common electrode, a primary direct current power source connected in said output circuit, an alternating current input circuit between said control electrode and said common electrode, said output circuit being inductively coupled to said input circuit to feedback alternating current of the proper phase and voltage to said input circuit to generate self-sustained oscillations; and means to initiate said oscillations comprising a series circuit connected between said control electrode and said common electrode said series circuit including a storage condenser, a first diode and a second diode, said diodes being oppositely polarized and one diode having a distinct reverse-resistance breakdown voltage, said distinct voltage being less than the voltage of said power source and greater than the necessary feedback voltage to the control electrode voltage to sustain said oscillations.

2. An oscillator comprising a first and a second transistor each having a collector, emitter and base element, a transformer winding having a center tap, means for connecting the emitter of each of said transistors to said winding on either side of said center tap and spaced therefrom, means for applying an operating direct current potential between said transformer center tap and the collector elements of said transistors, means for coupling the base of each of said transistors to said transformer winding on either side of said center tap and spaced from the points of connection of said emitters for applying a feedback alternating voltage from said transformer to the base elements of said transistors to sustain oscillations, means for initiating oscillations comprising a series circuit coupled between said collector element and base element of one of said transistors, said series circuit including two oppositely polarized rectifiers and a storage condenser, one of said rectifiers having a reverse breakdown voltage which is less than said operating direct current potential so that the charge of said storage condenser will discharge into the base-collector circuit when said potential is applied to said base to initiate conduction and oscillation, and said breakdown voltage being greater than said feedback alternating voltage so that said series circuit is effectively decoupled after oscillations start.

3. A transistor oscillator having an output circuit and an input circuit coupled to generate self-sustained oscillations, a direct current source connected in said output circuit, starter circuit means to momentarily bias the control electrode of the transistor to cause conduction and initiation of oscillation when the direct current power of said source is applied to the transistor, said means including a Zener diode and a storage condenser connected in series across the input circuit of said transistor, the Zener breakdown voltage of said Zener diode being less than said direct current voltage of said source to discharge the charge of said condenser into said input circuit when the Zener breakdown voltage is exceeded, means for decoupling said starter circuit means after oscillation starts when the control electrode bias voltage drops, said means for decoupling comprising a second diode in series with said Zener diode, said second diode being reversely polarized with respect to said Zener diode to prevent forward current through said Zener diode, and a leakage resistance of high ohmic value connected across said storage condenser to discharge said condenser when oscillations cease.

References Cited in the file of this patent

UNITED STATES PATENTS

| | | |
|---|---|---|
| 2,841,712 | Hoge et al. | July 1, 1958 |
| 2,964,717 | Carstedt et al. | Dec. 13, 1960 |
| 2,997,664 | Jensen | Aug. 22, 1961 |